US012685237B2

(12) United States Patent
Panho

(10) Patent No.: US 12,685,237 B2
(45) Date of Patent: Jul. 21, 2026

(54) AGRICULTURAL IMPLEMENT FOR INCORPORATING SEEDS INTO THE SOIL

(71) Applicant: Valtuir Antonio Panho, Corpus Christi (PY)

(72) Inventor: Valtuir Antonio Panho, Corpus Christi (PY)

( * ) Notice: Subject to any disclaimer, the term of this patent is extended or adjusted under 35 U.S.C. 154(b) by 614 days.

(21) Appl. No.: 18/035,022

(22) PCT Filed: Sep. 24, 2021

(86) PCT No.: PCT/BR2021/050408
§ 371 (c)(1),
(2) Date: Sep. 21, 2023

(87) PCT Pub. No.: WO2022/094680
PCT Pub. Date: May 12, 2022

(65) Prior Publication Data
US 2025/0113750 A1 Apr. 10, 2025

(30) Foreign Application Priority Data
Nov. 9, 2020 (BR) .......................... 102020022780-7

(51) Int. Cl.
*A01B 35/28* (2006.01)
*A01C 7/10* (2006.01)
*A01C 7/20* (2006.01)
(52) U.S. Cl.
CPC .............. *A01B 35/28* (2013.01); *A01C 7/102* (2013.01); *A01C 7/208* (2013.01)
(58) Field of Classification Search
CPC ......... A01B 35/28; A01B 35/16; A01B 23/04; A01B 31/00; A01B 19/02; A01C 7/102; A01C 7/208
See application file for complete search history.

(56) References Cited

U.S. PATENT DOCUMENTS 25,824 A * 10/1859 Hamsher .............. A01B 49/027
172/177
1,032,998 A * 7/1912 Erb ........................ A01B 19/02
172/189
(Continued)

FOREIGN PATENT DOCUMENTS

BR 7002478 U 4/1991
BR 7700913 U 5/1999
(Continued)

OTHER PUBLICATIONS

International Search Report with mailing date of Nov. 12, 2021, 2 pages.

*Primary Examiner* — Jamie L McGowan
(74) *Attorney, Agent, or Firm* — Berg Hill Greenleaf Ruscitti LLP

(57) ABSTRACT

The implement for incorporating seeds into the soil comprises a chassis provided with a header (1) for coupling to the tractor and a transverse side member (15) with wheels (12) and hooks (13) for mounting the ends of chain segments (2) with a trolley (3). The chain segments have swivel joints (22) and rotating links (21), which form front spacers mounted on the hooks of the transverse side member (151) and the rear spacers mounted on the trolley. The trolley comprises a longitudinal bar (31) with a rear frame (32) provided with bearings (33) for the shaft of a toothed roller (34) that rotates when the incorporating implement is moving. The front of the longitudinal bar has a support (35) with pins (36) for mounting the swivel joints of the chain segments. The toothed roller consists of a shaft (37) with welded radial plates (38). The link of the chain segments is formed by an oblong link (21) with welded radial plates (23) and a spider wheel (24) attached to the branches.

6 Claims, 7 Drawing Sheets

(56)         References Cited

U.S. PATENT DOCUMENTS

Figure 1:
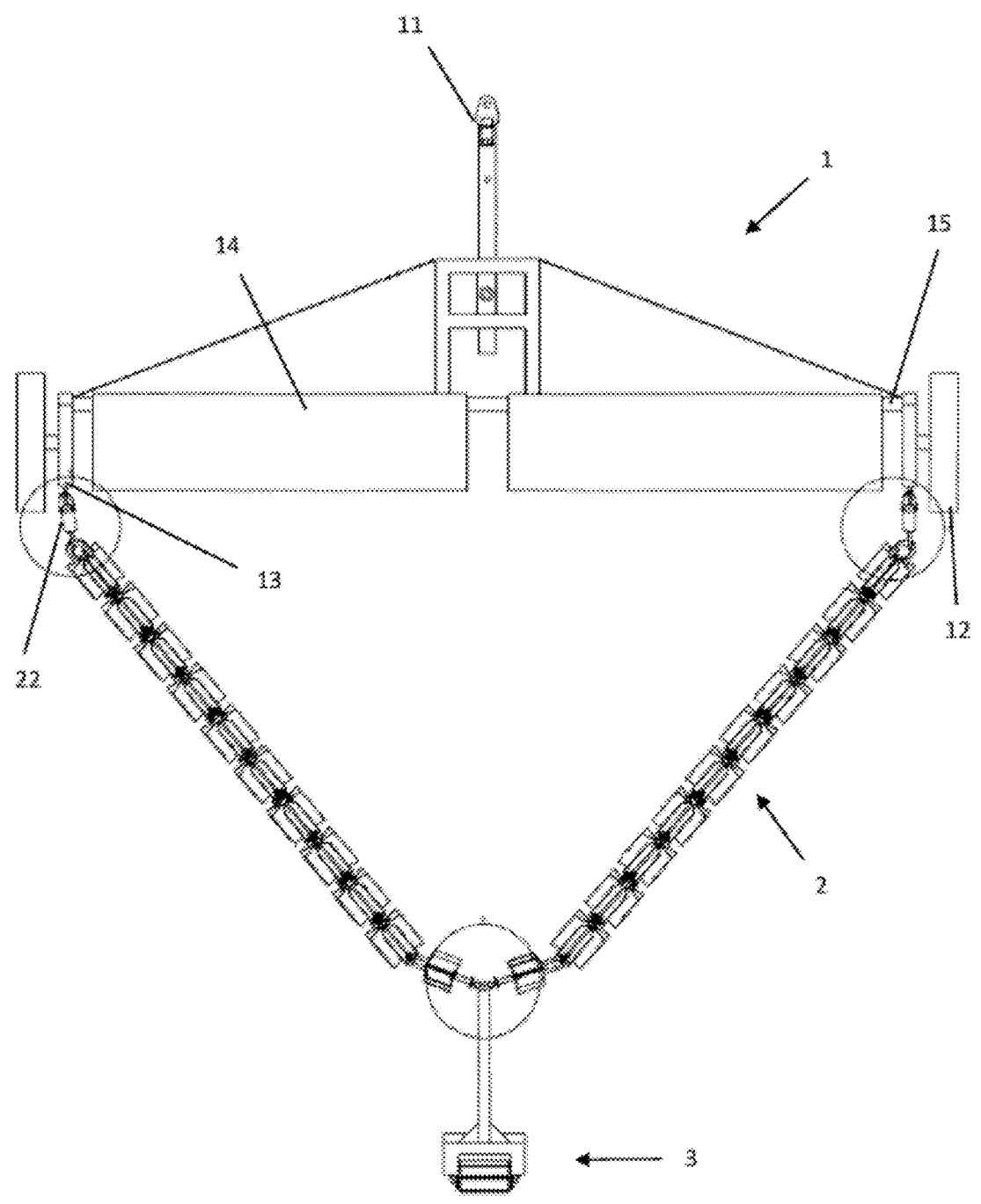

| | | | | | |
|---|---|---|---|---|---|
| 1,051,873 | A | * | 1/1913 | Erb | A01B 31/00 |
| | | | | | 172/612 |
| 1,836,984 | A | * | 12/1931 | Newsom | A01B 35/16 |
| | | | | | 172/532 |
| 2,553,356 | A | * | 5/1951 | Cady | A01B 35/16 |
| | | | | | 56/379 |
| 4,817,732 | A | * | 4/1989 | Brown | A01B 35/16 |
| | | | | | 172/551 |
| 4,893,682 | A | * | 1/1990 | Smallacombe | A01B 13/16 |
| | | | | | 172/612 |
| 5,000,270 | A | * | 3/1991 | Phillips | A01B 21/04 |
| | | | | | 172/612 |
| 5,794,712 | A | * | 8/1998 | Phillips | A01B 73/044 |
| | | | | | 172/612 |
| 6,484,812 | B1 | * | 11/2002 | Clark | A01B 21/04 |
| | | | | | 172/776 |
| 11,582,892 | B2 | * | 2/2023 | Jafar Abboud | A01B 15/14 |
| 2018/0184569 | A1 | * | 7/2018 | Kelly | A01B 33/024 |
| 2021/0168987 | A1 | * | 6/2021 | Jafar Abboud | A01B 29/04 |

FOREIGN PATENT DOCUMENTS

| | | | |
|---|---|---|---|
| BR | 202014024289 | U2 | 10/2016 |
| BR | 202018069362 | U2 | 3/2020 |

* cited by examiner

FIG. 8
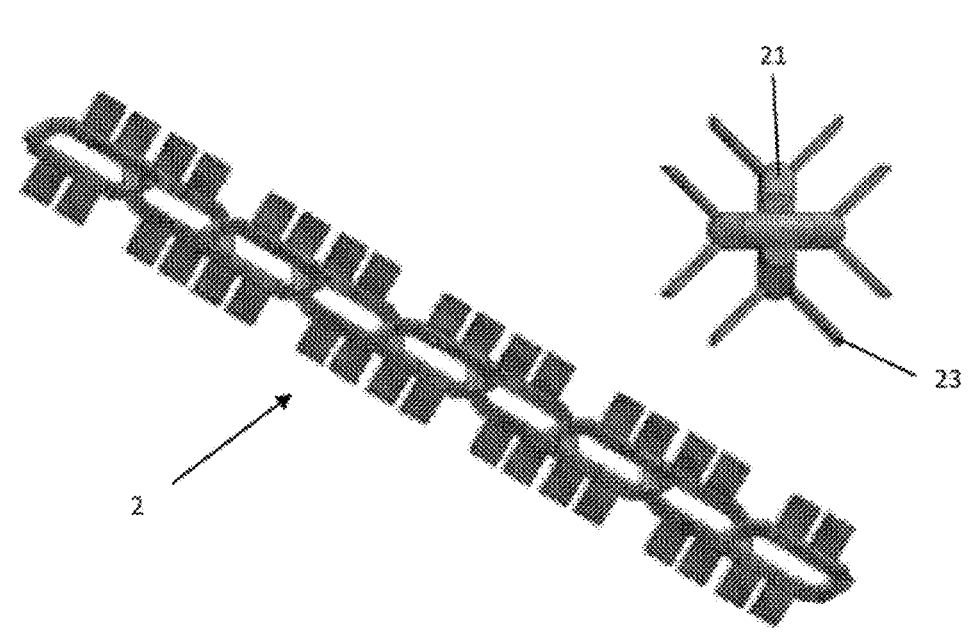
FIG. 7
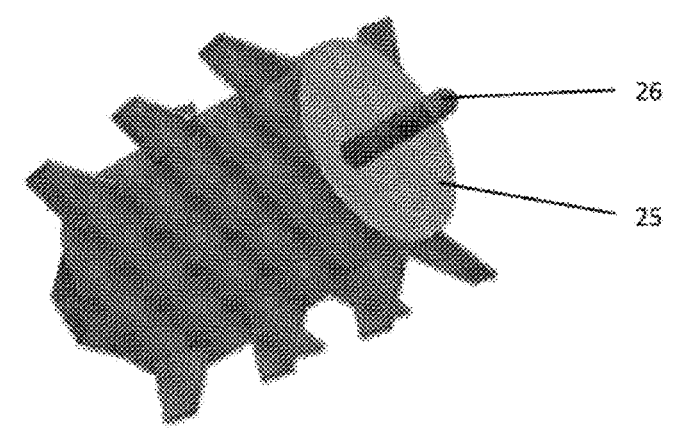
FIG. 9

AGRICULTURAL IMPLEMENT FOR INCORPORATING SEEDS INTO THE SOIL

CROSS-REFERENCE TO RELATED APPLICATION

This application is a national stage application under 35 U.S.C. 371 of PCT Application No. PCT/BR21/50408 having an international filing date of Sep. 24, 2021, which designated the United States, which PCT application claimed the benefit of Brazil application Ser. No. 102020022780-7, filed Nov. 9, 2020, both of which are incorporated by reference in their entirety. #

TECHNICAL SECTOR

The present invention pertains to the technological sector of agricultural implements, more specifically it refers to an implement for incorporating seeds into the soil that comprises a special chain, whose links are oblong and provided with radial plates, with a central trolley, the combination being transversally disposed behind the tractor, which in movement assumes a substantially triangular shape which is dragged, turning the soil and effectively and uniformly incorporating the seeds throughout the farmed area.

STATE OF THE ART

Some types of seeds, such as, millet, *Brachiaria*, sorghum and others, are cast into the ground through casting distributors. Subsequently the seeds need to be incorporated into the soil, and one of the techniques employed is the use of ploughing harrow which turns the ground and buries the seeds. One drawback in adopting a ploughing harrow is that the seeds may be buried at a greater depth, hampering or thwarting the viability of suitable development of the crop. Another technique for sowing these types of seeds is to carry through the incorporation into the soil by means of chains that are pulled by tractor and dragged over the ground.

Patent document BR PI 0605551-6 describes an agricultural implement that incorporates the seeds that comprises a chassis provided with a header mounted on the three hydraulic points of the tractor, whereon a cross bar is fastened from where multifold conventional chain segments hang in parallel, of the type with oblong links that are dragged over the soil. One limitation of this type of incorporating implement is that the chains are dragged axially, being free to move sideward with random and preferred paths, according to the bumps in the ground. So there is no guarantee of uniformity of incorporating the seeds in the entire crop area, which may result in parts of the soil where seeds are not incorporated. This fact is worsened as the speed of the tractor increases, since when they jump, the chains lose direct contact with the soil.

Patent document U.S. Pat. No. 1,522,074 describes a sower provided with a chassis with coupling to be towed by a tractor comprising two spiral rollers between which the seeds fall by gravity onto the ground. Due to the spiral form of the rollers, the ground is furrowed, and the seeds fall into the furrows. A set of loose chains is dragged after the second roller, causing the incorporation of the seeds into the soil. This agricultural implement presents the same arrangement of the chains and results in the same limitations as the preceding document.

Patent document U.S. Pat. No. 5,152,234 describes a sower provided with a cross chassis towed by tractor that comprises rotary reservoirs in the form of perforated drums.

The seeds fall from inside the drums into the soil. A set of loose chains is dragged, causing the incorporation of the seeds into the soil. This agricultural implement presents the same arrangement of the chains and results in the same limitations as the preceding documents.

Patent document BR MU 7000479 describes an agricultural implement sower comprising a towed chassis, being provided with a header for coupling to the tractor. This chassis has two wheels for displacement and a rotary reservoir in the form of a perforated drum. A cross chain is dragged over the ground to incorporate the seeds falling by gravity onto the ground. One limitation of this type of sower is the non-uniform incorporation of the seeds, since the chain is of the traditional type, that is, formed by oblong links, which may jump when dragged, leaving parts of the ground unturned. So there is no guarantee of uniform incorporation of seeds throughout the farmed area, and may result in parts of the soil where seeds are not incorporated. This fact is worsened as the speed of the tractor increases, since when they jump, the chains lose direct contact with the soil.

Novelties and Objective of the Invention

The objective of the present invention is an agricultural implement for incorporating seeds into the soil which effectively solves the limitations of the state of the art referred to previously.

The implement for incorporating seeds into the soil comprises a chassis with a header for coupling to the tractor and a transverse side member with wheels and end hooks for fastening the ends of two chain segments. A trolley is mounted at the juncture of the two chain segments, having a toothed roller making the chain assembly assume a substantially triangular shape and maintain permanent contact with the ground. Swivel joint devices are mounted at the ends of the chain. The links of the chain segments are rotary and have radial plates that effectively turn the soil, assuring that the seeds are buried.

Optionally, a reservoir with seed metering device may be mounted on the chassis.

Alternatively, the chain can be formed by oblong links with welded radial plates.

Also alternatively, the chain links can be toothed rollers with end hooks.

Further alternatively, the chain links can be formed by cylindrical bodies with end hooks.

One constructive option of the implement for incorporating seeds into the soil comprises a transverse side member with end wheels and end hooks for mounting the ends of two front chain segments and two rear chain segments. The trolley is mounted at the juncture of the two rear chain segments. The juncture of the two front chain segments is mounted on the tractor coupling.

Advantages of the Invention

The agricultural implement for incorporating seeds into the soil, object of the present invention, provides the following advantages on the incorporating implements of the state of the art:

it has a trolley positioned between two chain segments that keep its links close to the ground, assuring permanent contact with the soil;

the chain segments are formed by rotating links that roll over the ground;

the links of the chain segments have radial plates that penetrate and effectively turn the earth, assuring effective incorporation of the seeds into the soil;

the toothed roller of the central trolley also has radial plates that equally penetrate and effectively turn the earth incrementing the incorporation of the seeds into the soil;

it can be applied in sowers of millet, *Brachiaria*, sorghum and other seeds.

DESCRIPTION OF THE ACCOMPANYING DRAWINGS

Figure 2:
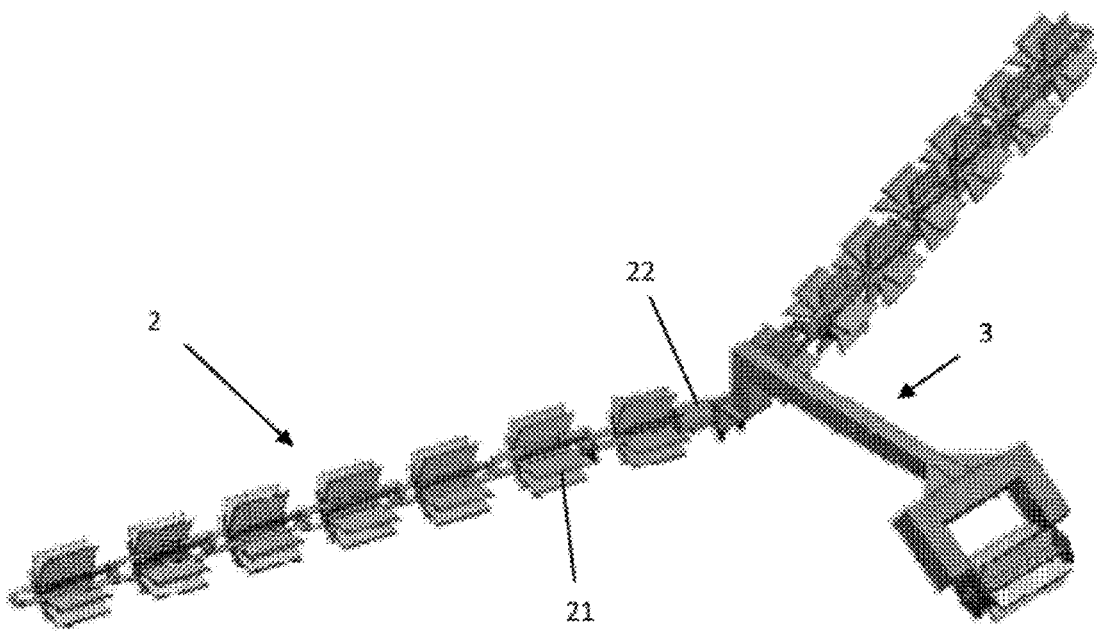
Figure 3:
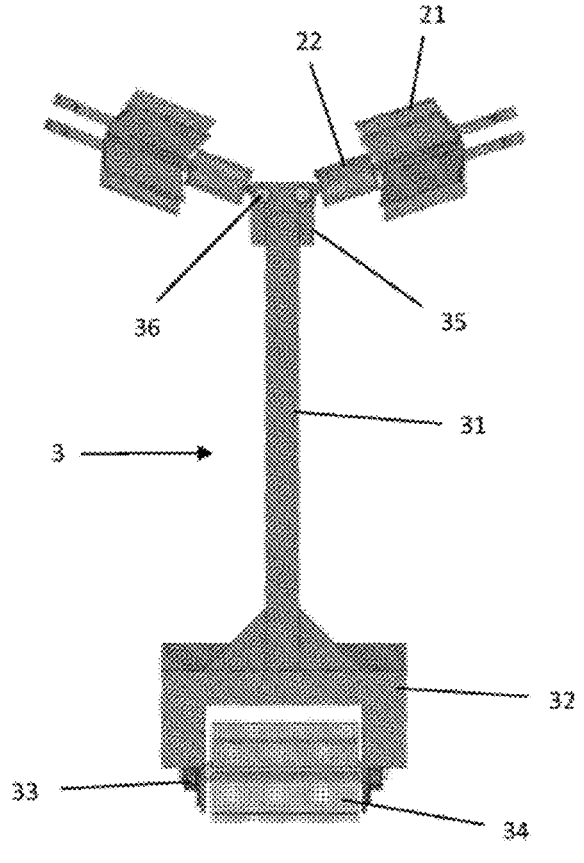
Figure 4:
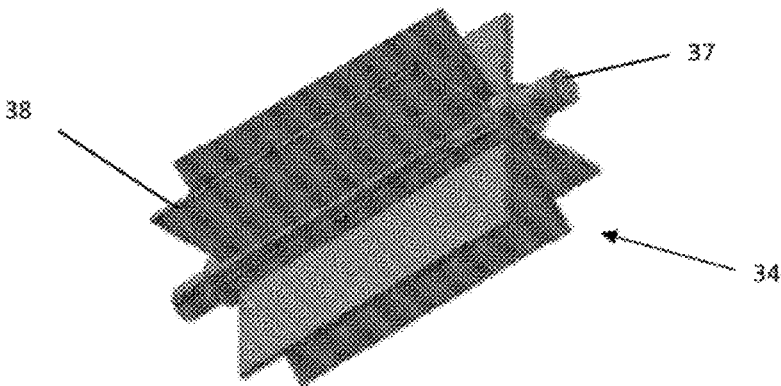
Figure 5:
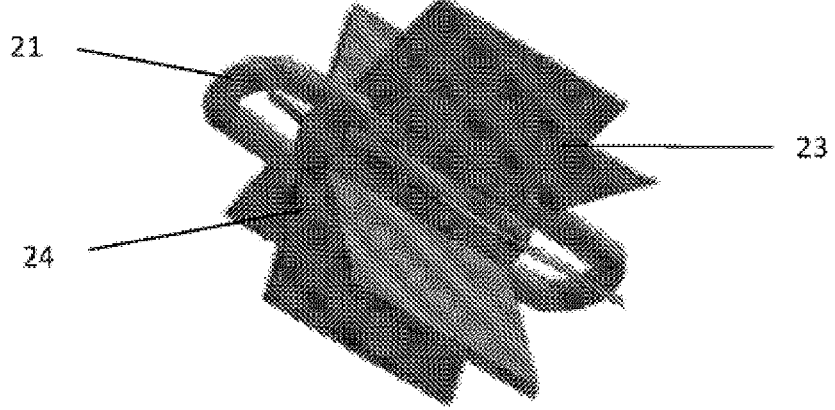
Figure 6:
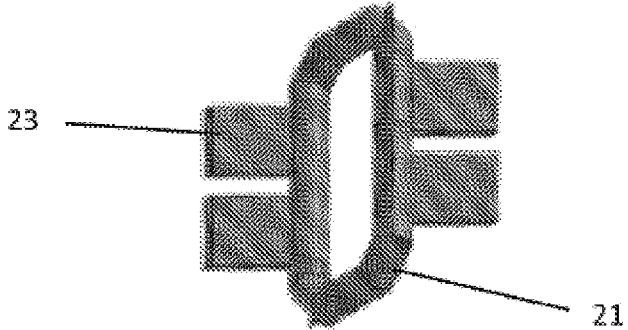
Figure 10:
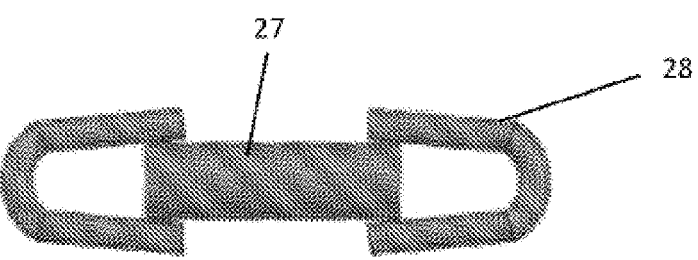
Figure 11:
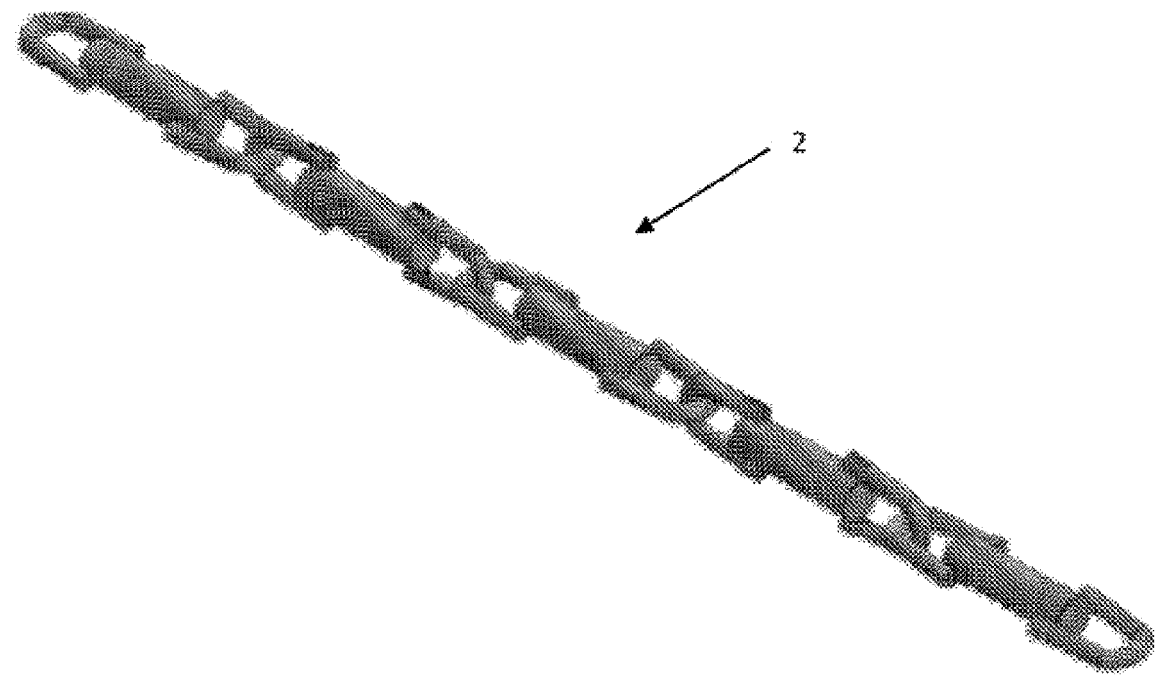
Figure 12:
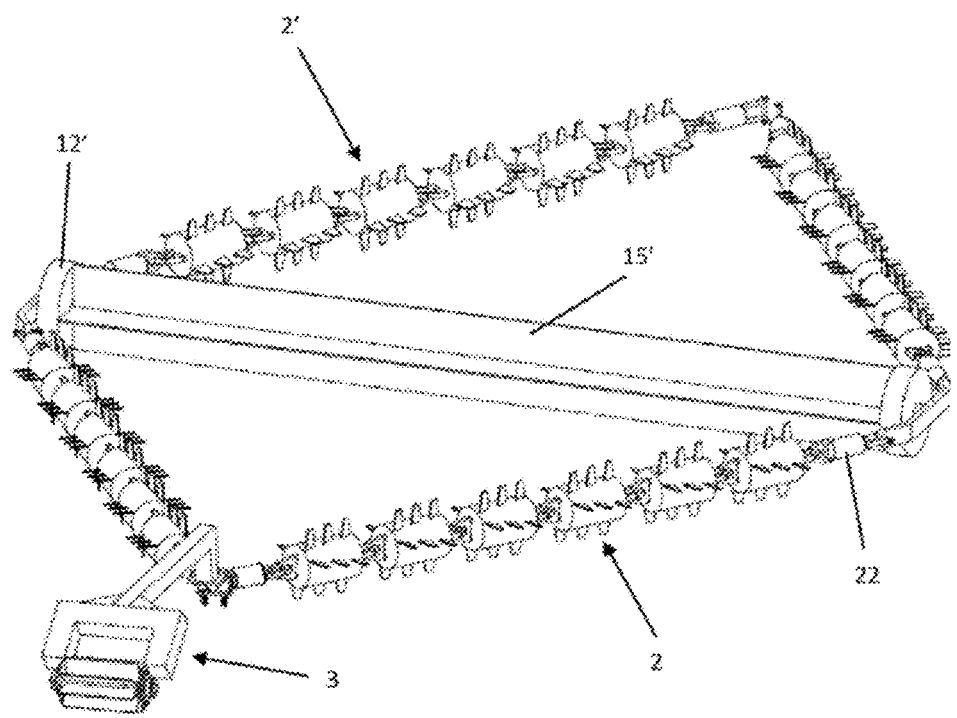
Figure 13:
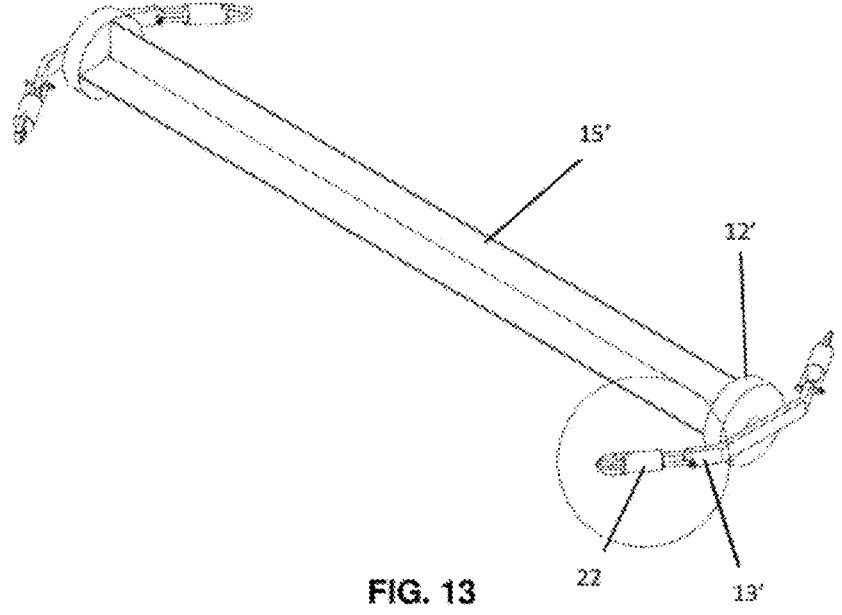

For the present invention to be fully understood and put into practice by any person skilled in this technological sector, it will now be described in a clear, precise and sufficient manner, based on the accompanying drawings, set out below, which illustrate preferred embodiments of the seed incorporating implement:

FIG. 1—perspective view of the seed incorporating implement;

FIG. 2—perspective view of the chain assembly;

FIG. 3—plan view detailing the trolley;

FIG. 4—perspective view detailing the toothed roller of the trolley;

FIG. 5—perspective view detailing a link with radial plates;

FIG. 6—perspective view of a first constructive option of the link with welded radial plates;

FIG. 7—perspective view of the chain mounted with the links of FIG. 6;

FIG. 8—front view of the chain mounted with the links of FIG. 6;

FIG. 9—perspective view of a second constructive option of the link of the chain formed by toothed rollers;

FIG. 10—side view of third constructive option of the link of the chain formed by cylindrical body with end hooks;

FIG. 11—perspective view of the chain mounted with the links of FIG. 10;

FIG. 12—perspective view of a constructive option of the incorporating implement;

FIG. 13—perspective view detailing a transverse side member of the constructive option of the incorporating implement.

FIGS. 1 and 2 illustrate the agricultural implement for incorporating seeds into the soil (1) which comprises a chassis provided with a header (11) for coupling to the tractor (not illustrated) and a transverse side member (15) with end wheels (12) and end hooks (13) for mounting the ends of two chain segments (2). At the juncture of the two chain segments (2) a trolley is mounted (3). The chain segments (2) are composed of links (21) and end swivel joints (22), as the chain links are rotary, the front ones mounted on the end hooks (13) of the transverse side member (15) and those mounted on the trolley (3).

FIG. 3 details the trolley (3) comprising a longitudinal bar (31) with a rear frame (32) provided with bearings (33) for the shaft of a toothed roller (34) that rotates when the incorporating implement is moving. At the front of the longitudinal bar (31) there is disposed a support (35) with pins (36) for mounting the swivel joints (22) of the chain segments (2).

FIG. 4 details the toothed roller (34) consisting of a shaft (37) with welded radial plates (38).

FIG. 5 details a link of the chain segments (2) which is formed by an oblong link (21) with welded radial plates (23) and a spider wheel (24) attached between its branches.

During displacement of the incorporating implement, the trolley (3) makes the chain segment combination (2) assume a substantially triangular shape, and keeps the links (21) of the chain segments (2) close to the ground, such that its radial plates (23), and the radial plates (38) of the toothed roller (38) of the central trolley (3) penetrate and effectively turn the earth, assuring effective incorporation of the seeds into the soil.

Optionally, on the transverse side member (15) of the chassis (1) a reservoir with seed metering device (14) may be mounted, as per the illustrative example in FIG. 1.

Alternatively, as detailed in FIGS. 6 to 8, the chain segments (2) can be formed solely by oblong links (21) with welded radial plates (23).

Further alternatively, as detailed in FIG. 9, the chain segments can be formed by toothed rollers (25) with end hooks (26).

Further alternatively, as detailed in FIGS. 10 and 11, the chain segments (2) can be formed by cylindrical bodies (27) with end hooks (28).

FIG. 12 illustrates an constructive option of the implement for incorporating seeds into the soil comprising a transverse side member (15') with end wheels (12') and end hooks (13') for mounting the swivel joints (22) of the ends of two front chain segments (2') and the two rear chain segments (2). The trolley (3) is mounted at the juncture of the two rear chain segments (2). The juncture of the two front chain segments (2') is mounted on the tractor coupling (not illustrated).

FIG. 13 details a transverse side member (15') with end wheels (12') and end hooks (13') of the constructive option illustrated in FIG. 12.

It is emphasized that the drawings and the description presented are not intended to limit the forms of execution of the inventive concept now proposed, but to illustrate and render the conceptual innovations disclosed by the invention comprehensible. Therefore, the descriptions and images should be interpreted in an exemplary and non-limitative manner, and there may be other equivalent or analog forms of implementation that should be considered within the scope of the present invention.

The present specification refers to an agricultural implement for incorporating seeds into the soil, resulting in a new technical effect in relation to the state of the art, thus proving its novelty, inventive activity, full disclosure and industrial application, satisfying all the requirements for the grant of a patent of invention.

The invention claimed is:

1. An agricultural implement for incorporating seeds into the soil comprising:

a chassis (1) provided with a header (11) for coupling to a tractor and a transverse side member (15) with end wheels (12) and end hooks (13) for fastening the ends of the chain (2), characterized by having two chain segments (2) and a trolley (3), the chain segments (2) being composed of rotating links (21) and end swivel joints (22), the end swivel joints (22) being mounted on the end hooks (13) of the transverse side member (15) and on the trolley (3) and the trolley (3) being formed by a structure with bearings (33) for a toothed rotating roller (34);

the trolley (3) comprising a longitudinal bar (31) with a rear frame (32) provided with bearings (33) for the shaft of the toothed roller (34) moved by the displacement of the incorporating implement and having at the front of the longitudinal bar (31) a support (35) with pins (36) for mounting the end swivel joints (22) of the chain segments (2);

wherein the toothed roller (34) is comprised of a shaft (37) with welded radial plates (38); and the chain segments (2) comprising a plurality of links (21) provided with a spider wheel (24) attached between the links.

2. The agricultural implement according to claim 1, characterized in that the chain segments (2) are formed by a plurality of oblong links (21) with welded radial plates (23).

3. The agricultural implement according to claim 1, characterized in that the links of the chain segments (2) are formed by toothed rollers (25) with end hooks (26).

4. The agricultural implement according to claim 1, characterized in that the links of the chain segments (2) are formed by cylindrical bodies (27) with end hooks (28).

5. The agricultural implement according to claim 1, characterized in that a reservoir with a seed metering device (14) is mounted on the transverse side member (15) of the chassis (1).

6. The agricultural implement according to claim 1, characterized by having two front chain segments (2') mounted on the transverse side member (15') by way of the swivel joints (22) and on a tractor coupling.

*   *   *   *   *